(12) United States Patent
Furui

(10) Patent No.: US 10,506,207 B2
(45) Date of Patent: Dec. 10, 2019

(54) PROJECTION SYSTEM, METHOD FOR CONTROLLING PROJECTION SYSTEM, AND PROJECTOR

(71) Applicant: SEIKO EPSON CORPORATION, Tokyo (JP)

(72) Inventor: Shiki Furui, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/262,077

(22) Filed: Jan. 30, 2019

(65) Prior Publication Data
US 2019/0238807 A1    Aug. 1, 2019

(30) Foreign Application Priority Data

Jan. 31, 2018 (JP) .................................. 2018-015064

(51) Int. Cl.
*H04N 9/31* (2006.01)

(52) U.S. Cl.
CPC .......... *H04N 9/3147* (2013.01); *H04N 9/3185* (2013.01)

(58) Field of Classification Search
CPC ....... H04N 9/31; H04N 9/3147; H04N 9/3185
See application file for complete search history.

(56) References Cited

U.S. PATENT DOCUMENTS

| 6,151,122 A * | 11/2000 | Taniguchi | G03F 7/70358 |
| | | | 356/399 |
| 6,222,593 B1 * | 4/2001 | Higurashi | G03B 37/04 |
| | | | 315/368.12 |
| 6,480,175 B1 * | 11/2002 | Schneider | G06F 3/1446 |
| | | | 345/32 |
| 6,717,528 B1 * | 4/2004 | Burleson | G08C 17/02 |
| | | | 340/12.22 |
| 6,824,271 B2 * | 11/2004 | Ishii | G01J 3/51 |
| | | | 348/383 |
| 6,932,481 B2 * | 8/2005 | Koyama | H04N 5/44513 |
| | | | 345/619 |
| 10,009,583 B2 * | 6/2018 | Ito | H04N 9/3147 |

(Continued)

FOREIGN PATENT DOCUMENTS

JP        2011-182079 A        9/2011

*Primary Examiner* — Jefferey F Harold
*Assistant Examiner* — Mustafizur Rahman
(74) *Attorney, Agent, or Firm* — Oliff PLC

(57) ABSTRACT

A projection system which arranges n×m projection images and forms one composite projection image on a projection surface includes: n×m projectors; an operation unit which accepts an operation by a user; and a control unit which controls the projection by each of the n×m projectors. The control unit causes a reference image showing a reference point common to a plurality of projection areas to be projected in an overlap area where the plurality of projection areas overlap each other, and causes each of a plurality of projectors projecting the projection image in the overlap are where the reference image to be moved is projected, to execute geometric correction of the projection image in such a way that the reference image moves to a position on the projection surface designated by the user by the operation via the operation unit, and to project the projection image.

15 Claims, 9 Drawing Sheets

(56) References Cited

U.S. PATENT DOCUMENTS

| | | | |
|---|---|---|---|
| 2009/0002637 A1* | 1/2009 | Harada | H04N 9/3147 |
| | | | 353/30 |
| 2011/0210979 A1 | 9/2011 | Furui | |
| 2012/0050698 A1* | 3/2012 | Kotani | G03B 21/14 |
| | | | 353/94 |
| 2013/0222776 A1* | 8/2013 | Ishikawa | H04N 9/3185 |
| | | | 353/121 |
| 2013/0250251 A1* | 9/2013 | Kubota | G03B 21/14 |
| | | | 353/57 |
| 2014/0111536 A1* | 4/2014 | Shinozaki | G09G 5/37 |
| | | | 345/589 |
| 2015/0213584 A1* | 7/2015 | Ishikawa | G06F 3/1446 |
| | | | 345/637 |

* cited by examiner

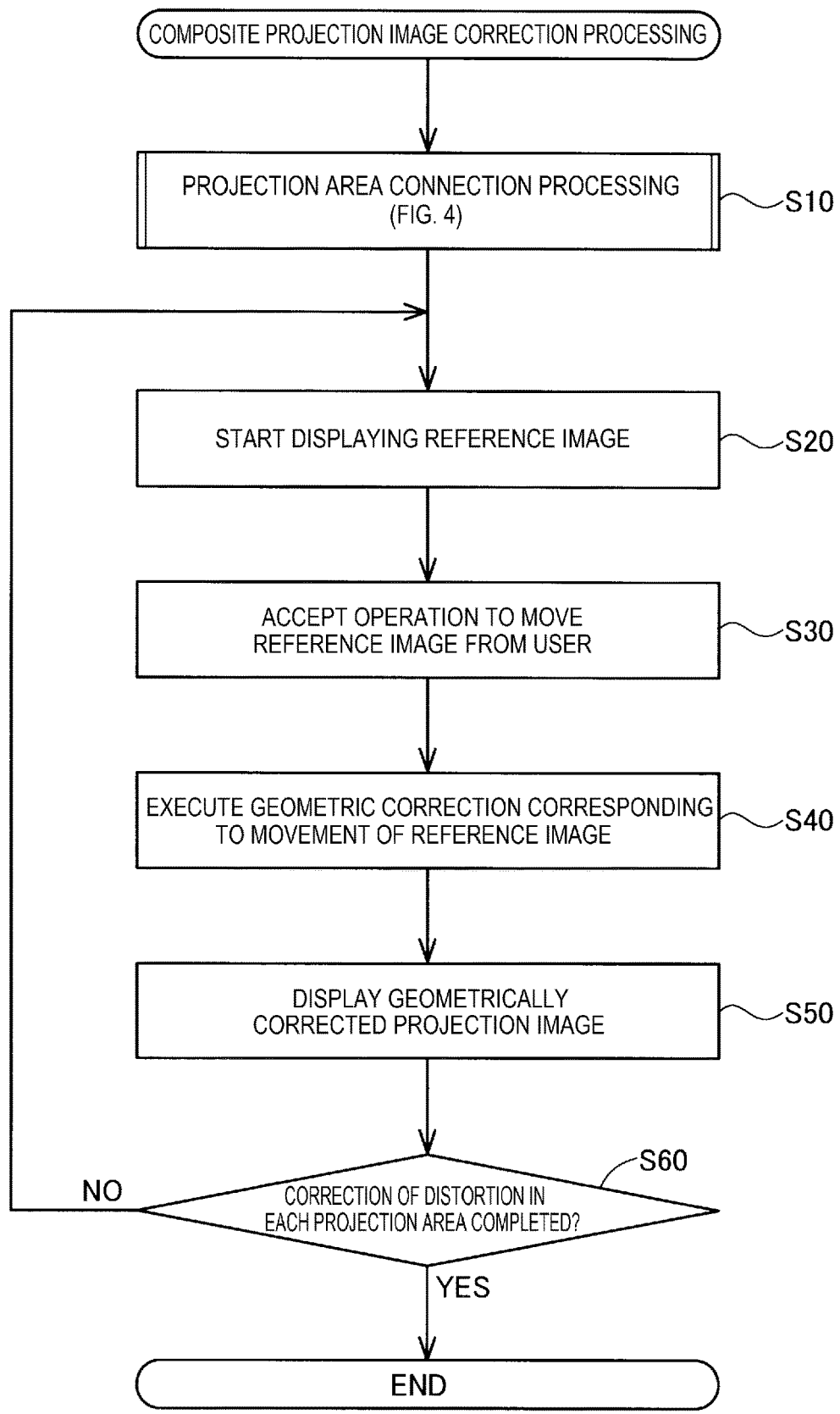

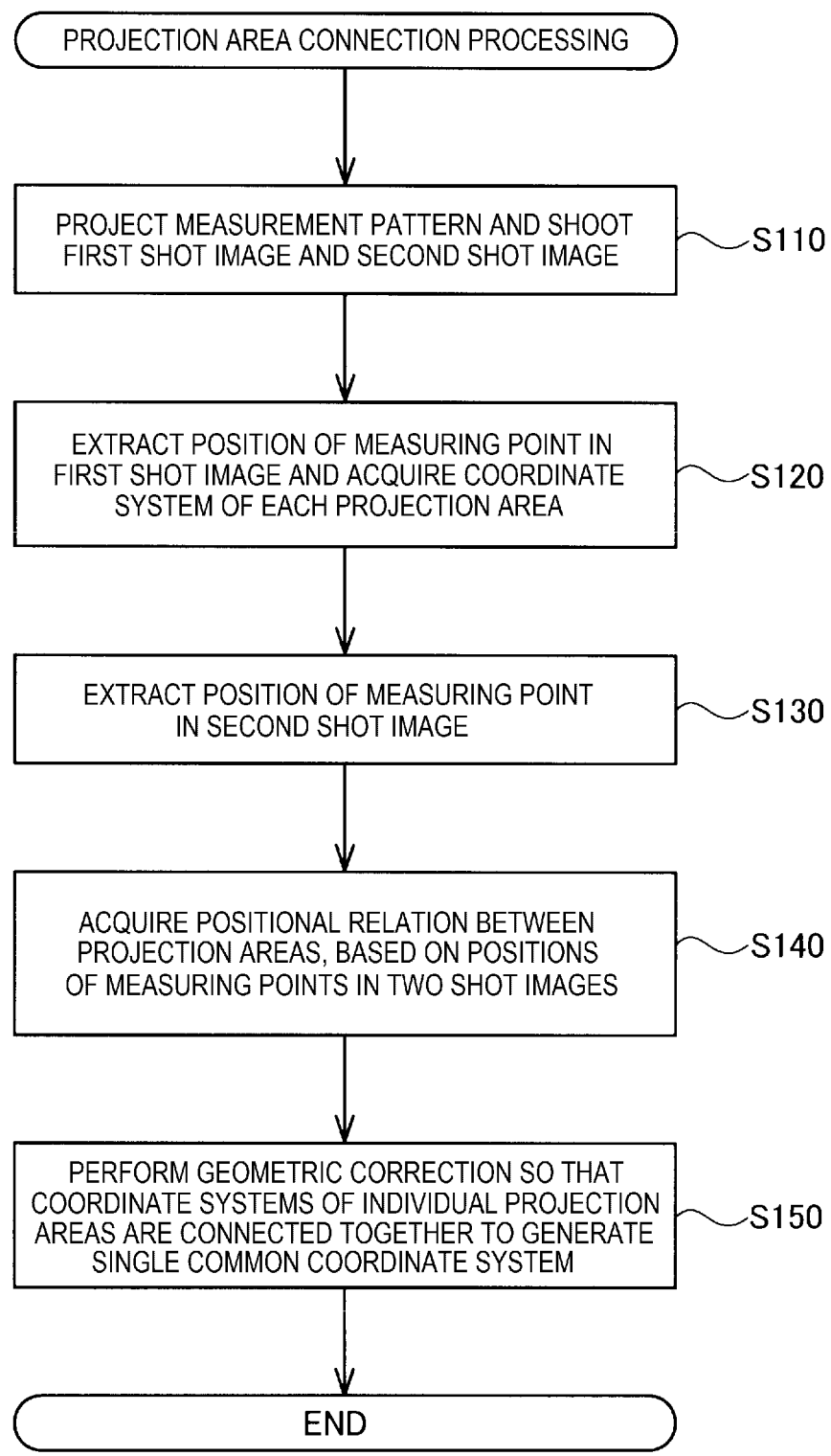

PROJECTION SYSTEM, METHOD FOR CONTROLLING PROJECTION SYSTEM, AND PROJECTOR

BACKGROUND

1. Technical Field

The present disclosure relates to a projector.

2. Related Art

For example, JP-A-2011-182079 discloses, as a projection system, an image display system employing a so-called multi-projection method in which projection images from a plurality of projectors are arranged in two directions, that is, longitudinal and lateral directions, on a common projection surface to form one projection image. The image display system disclosed in JP-A-2011-182079 corrects a distortion of a whole image made up of a plurality of projection images combined together, by adjusting the positions of the four corners of the whole image.

Generally, in the projection system employing the multi-projection method as described above, the way the projection image from each projector is distorted may vary, depending on the difference in the attitude of each projector when projecting the projection image. Also, if the projectors use, for example, a projection lens with a large distortion such as a short-focus projection lens, the way the projection image from each projector may vary significantly, due to the distortion of the projection lens. Therefore, simply correcting, at a time, a whole image made up of a plurality of projection images as in the technique of JP-A-2011-182079 may result in increase in the misalignment or distortion at the joints between the plurality of projection images and consequently deterioration in the image quality of the whole image. In the projection system employing the multi-projection method, it is desirable that the deterioration in the image quality due to the distortion of each of the plurality of projection images can be restrained by a simpler method.

SUMMARY

[1] A first aspect of the invention is provided as a projection system which arranges n×m projection images in such a way that n projection images are arranged in a first direction and that m projection images are arranged in a second direction intersecting the first direction, n being an arbitrary natural number equal to or greater than 2, m being an arbitrary natural number equal to or greater than 1, and in a state where projection areas of the projection images partly overlap each other in the first direction or the second direction, thus forming one composite projection image on a projection surface. The projection system includes: n×m projectors, each projecting the projection image on the projection surface; an operation unit which accepts an operation by a user; and a control unit which controls the projection by each of the n×m projectors. The control unit (i) causes at least one projector projecting the projection image to project a reference image showing a position of a reference point common to each of the projection areas, in an overlap area where the projection areas overlap each other, (ii) accepts an operation to move the reference image by the user via the operation unit, and (iii) causes each projector projecting the projection image in the overlap area where the reference image is displayed, of the n×m projectors, to execute geometric correction to convert a coordinate system of the projection area in such a way that the position of the reference point moves to a position on the projection surface designated by the user via the operation, and to project the projection image.

The projection system of this configuration can adjust the distortion of each of the adjacent projection images at a time in response to an operation by the user to adjust the position of the reference image displayed in the overlap area. Thus, the deterioration in the image quality due to the distortion of each projection image forming the composite projection image can be restrained easily.

[2] In the projection system of the aspect, each of the n×m projectors may have an image shooting unit which shoots an image of the projection area of the corresponding projector. The control unit may find a positional relation between the respective projection areas of the n×m projectors, using a measuring point in the overlap area shown in a shot image shot by the image shooting unit of each of the n×m projectors, as an indicator, and cause the reference image to be projected at a position common to a plurality of the projection images overlapping each other in the overlap area, using the positional relation.

The projection system of this configuration can easily specify the positional relation between the respective projection areas, based on the position of the measuring point shown in the shot image. Also, based on the specified positional relation between the projection areas, the coordinates on the projection surface where the reference image is displayed can be specified accurately and therefore the distortion of each projection image can be corrected very accurately. Thus, the image quality of the composite projection image can be improved further.

[3] In the projection system of the aspect, the control unit may cause the reference image to be projected, at least one each in an area where an inner peripheral edge part of an area where the composite projection image is formed and an end part of the overlap area intersect each other.

In the projection system of this configuration, the reference image is arranged along the inner peripheral edge of the composite projection image. Thus, a distortion generated in the outer peripheral shape of the projection area of the composite projection image can be adjusted easily.

[4] In the projection system of the aspect, the control unit may (i) cause a corner reference image to be projected, the corner reference image showing positions of four corners of an area where the composite projection image is projected, (ii) accept an operation to move the corner reference image by the user via the operation unit, and (iii) cause a projector projecting the corner reference image for which the operation to move is carried out by the user, of the n×m projectors, to execute geometric correction to convert a coordinate of the projection area in such a way that the positions of the corners shown by the corner reference image move to positions on the projection surface designated by the user via the operation unit, and to project the projection image.

The projection system of this configuration can easily adjust the distortion in the four corners of the area where the composite projection image is projected, based on the operation to move the corner reference image.

[5] In the projection system of the aspect, when m is a natural number equal to or greater than 2, the control unit may (i) cause at least one of four projectors whose projection area includes a center area where four of the projection areas including two of the projection areas adjacent to each other in the first direction and two of the projection areas adjacent to each other in the second direction overlap each other, of the n×m projectors, to project a center reference image which is the reference image in the center area, and (ii) cause each of the four projectors to execute geometric correction to perform coordinate conversion in such a way that the position of the reference point shown by the center reference image moves to a position on the projection surface designated by the user via the operation unit, and to project the projection image.

The projection system of this configuration can adjust the distortion in the four projection areas within the composite projection image at a time by the operation to move the single center reference image while maintaining the connection between the four projection areas. Thus, the distortion of each projection image forming the composite projection image can be reduced more efficiently by a simpler method.

[6] In the projection system of the aspect, a total number of the reference images including the center reference image and the corner reference images may be (n+1)×(m+1).

The projection system of this configuration displays one reference image each in the four corners of each projection area. Therefore, the user can visually recognize the state of the distortion in each projection area, based on the state of arrangement of the reference images. Also, the distortion in each projection area can be easily corrected.

[7] In the projection system of the aspect, each of the n×m projectors may include a first projector which projects a first projection image on the projection surface and a second projector which projects a second projection image on the projection surface, arranging the second projection image in a state where a first projection area of the first projection image and a second projection area of the second projection image partly overlap each other in the first direction. The control unit may control the projection by each of the first projector and the second projector and may (i) cause the first projector to project a reference image showing a position of a reference point common to the first projection area and the second projection area, in an overlap area where the first projection area and the second projection area overlap each other, (ii) accept an operation to move the reference image by the user via the operation unit, and (iii) cause the first projector and the second projector respectively projecting the first projection image and the second projection image in the overlap area where the reference image is displayed, to execute geometric correction to convert a coordinate system of the first projection area and the second projection area in such a way that the position of the reference point moves to a position on the projection surface designated by the user via the operation, and to project the first projection image and the second projection image.

The projection system of this configuration can adjust the distortion of each of the projection images from the first projector and the second projector at a time in response to an operation by the user to adjust the position of the reference image that is common to the first projector and the second projector and displayed in the overlap area. Thus, the deterioration in the image quality due to the distortion of each projection image forming the composite projection image can be restrained easily.

[8] A second aspect of the invention is provided as a method for controlling a projection system. In the projection system, n×m projectors arrange n×m projection images on a projection surface in such away that n projection images are arranged in a first direction and that m projection images are arranged in a second direction intersecting the first direction, n being an arbitrary natural number equal to or greater than 2, m being an arbitrary natural number equal to or greater than 1, and in a state where projection areas of the projection images partly overlap each other in the first direction or the second direction, thus forming one composite projection image. The method includes: causing at least one projector projecting the projection image to project a reference image showing a position of a reference point common to each of the projection areas, in an overlap area where the projection areas overlap each other; accepting an operation to move the reference image from the user; and causing each projector projecting the projection image in the overlap area where the reference image is displayed, of the n×m projectors, to execute geometric correction to convert a coordinate system of the projection area in such a way that the position of the reference point moves to a position on the projection surface designated by the operation by the user, and to project the projection image.

The method of this configuration can adjust the distortion of each of the adjacent projection images at a time in response to an operation by the user to adjust the position of the reference image displayed in the overlap area. Thus, the deterioration in the image quality due to the distortion of each projection image forming the composite projection image can be restrained easily.

[9] A third aspect of the invention is provided as a projector which, in collaboration with n×m−1 slave projectors, arranges n×m projection images on a projection surface in such a way that n projection images are arranged in a first direction and that m projection images are arranged in a second direction intersecting the first direction, n being an arbitrary natural number equal to or greater than 2, m being an arbitrary natural number equal to or greater than 1, and in a state where projection areas of the projection images partly overlap each other in the first direction or the second direction, thus forming one composite projection image. The projector includes: a projection unit which projects one of the n×m projection images; a communication unit which communicates with the n×m−1 slave projectors; an operation unit which accepts an operation by a user; and a control unit which accepts the operation by the user via the operation unit and controls the projection by the n×m−1 slave projectors and the projection unit. The control unit (i) causes at least one projector projecting the projection image in an overlap area where a plurality of the projection areas overlap each other, of the n×m projectors including the projector and the n×m−1 slave projectors, to project a reference image showing a position of a reference point common to each of the projection areas, in the overlap area, (ii) accepts an operation to move the reference image by the user via the operation unit, and (iii) causes each projector projecting the projection image in the overlap area where the reference image to be moved is displayed, of the n×m projectors, to execute geometric correction to convert a coordinate system of the projection area in such a way that the position of the reference point moves to a position on the projection surface designated by the user via the operation, and to project the projection image.

The projector of this configuration, in collaboration with the slave projectors, can easily implement the configuration to adjust the distortion of each of the adjacent projection images at a time in response to an operation by the user to adjust the position of the reference image displayed in the overlap area. Thus, the deterioration in the image quality due to the distortion of each projection image forming the composite projection image can be restrained easily.

Not all of the plurality of components in each of the above configurations are essential. To solve a part or all of the foregoing problems or to achieve a part or all of the effects described in this specification, a part of the plurality of components can be changed, deleted, or replaced by another component, and a part of its limitations can be deleted. Also, to solve a part or all of the foregoing problems or to achieve a part or all of the effects described in this specification, apart or all of the technical features included in each of the above described configurations can be combined with a part or all of the technical features included in another configuration, thus forming an independent configuration to implement the technique according to this disclosure.

The technique according to this disclosure can also be implemented in various other forms than the projection system, the method for controlling the projection system, and the projector. For example, the technique may also be provided as a method for correcting a projection image forming a composite projection image, a method for controlling a projector, a method for controlling a master projector, and a method for controlling a slave projector. Also, the technique can be implemented as a computer program to implement such a control method or correction method, and a non-temporary recording medium on which this computer program is recorded, or the like.

BRIEF DESCRIPTION OF THE DRAWINGS

The invention will be described with reference to the accompanying drawings, wherein like numbers reference like elements.

FIG. 3 is an explanatory view showing a flow of composite projection image correction processing.

FIG. 4 is an explanatory view showing a flow of coordinate system acquisition processing.

DESCRIPTION OF EXEMPLARY EMBODIMENTS

1. First Embodiment

Figure 1:
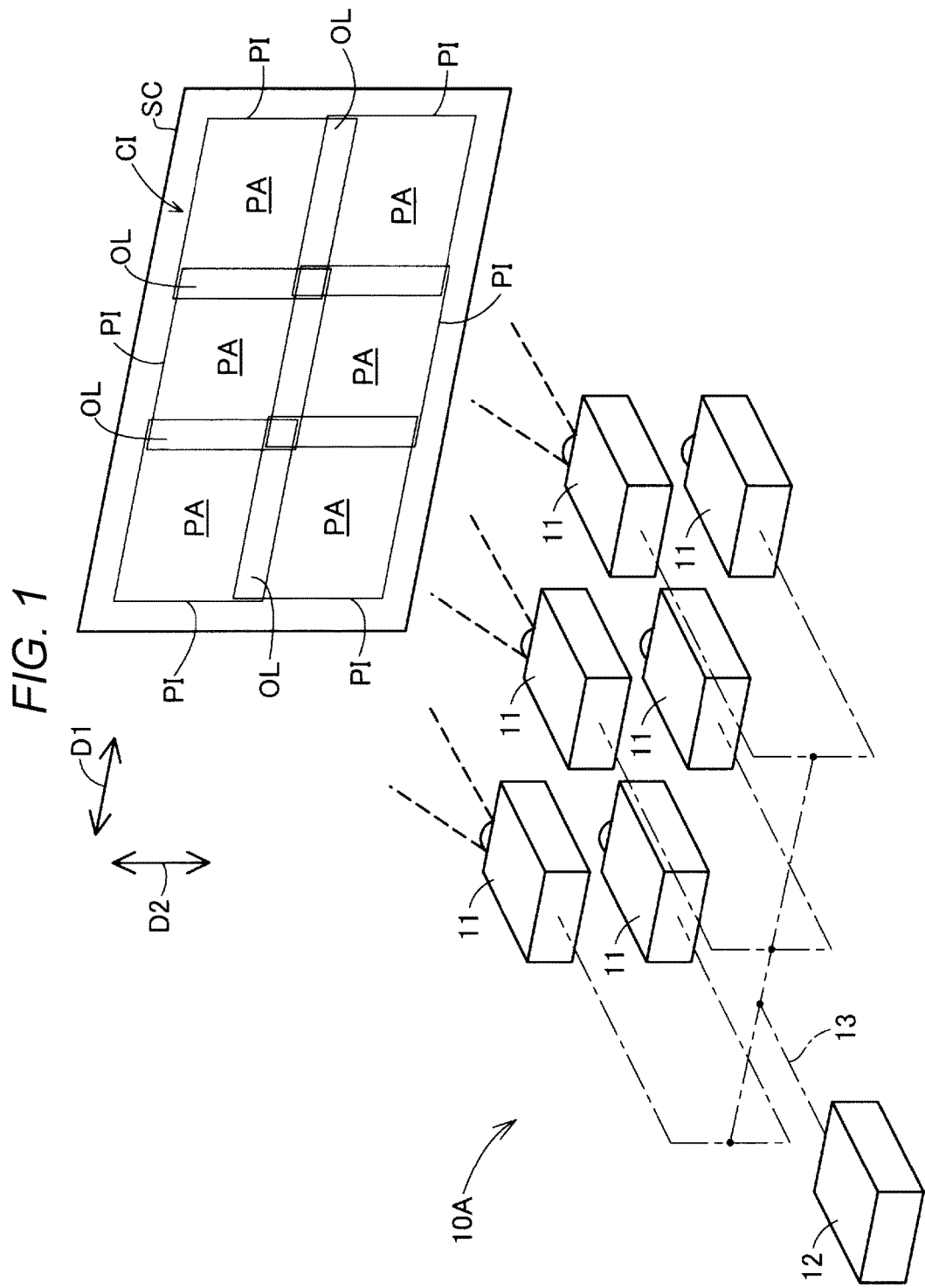
FIG. 1 is a schematic view schematically showing the configuration of a projection system according to a first embodiment.

FIG. 1 is a schematic view schematically showing the configuration of a projection system 10A according to a first embodiment. The projection system 10A, employing a multi-projection method, combines a plurality of split projection images PI on a projection surface SC and thus forms a composite projection image CI, which is one large whole image. In the first embodiment, the projection surface SC is a screen surface of a dedicated projection screen. The projection surface SC is not limited to the screen surface and may be, for example, a part of a wall surface of a building.

It is now assumed that n is an arbitrary natural number equal to or greater than 2 and that m is an arbitrary natural number equal to or greater than 1. The projection system 10A has n×m projectors 11. The composite projection image CI is formed by n×m projection images PI projected from the n×m projectors 11 on a one-to-one basis. For the sake of convenience, FIG. 1 shows a configuration of the projection system 10A where n=3 and m=2 hold. In this embodiment, the configuration example where the projection system 10A has six projectors 11 is also shown in other illustrations. However, the number of the projectors 11 provided in the projection system 10A is not limited to six.

In the composite projection image CI, the n×m projection images PI are arranged in such a way that n projection images PI are arranged in a first direction D1 and that m projection images PI are arranged in a second direction D2 intersecting the first direction D1. In the first embodiment, the first direction D1 is a direction parallel to a horizontal direction, and the second direction D2 is a vertical direction orthogonal to the first direction D1. The n×m projection images PI are arranged in the form of a matrix on the projection surface SC. In the example of FIG. 1, six projection images PI are arranged in the form of three in the lateral direction by two in the longitudinal direction. However, the form of arrangement of the projection images PI is not limited to the form of three in the lateral direction by two in the longitudinal direction shown in FIG. 1. For example, the first direction D1 and the second direction D2 may be switched. The second direction D2 may be a horizontal direction and the first direction D1 may be a vertical direction.

Projection areas PA where the individual projectors 11 project the projection images PI are arranged in the state where the projection areas PA adjacent to each other in the first direction D1 or the second direction D2 partly overlap each other on the projection surface SC. The projection area PA refers to an area where the projector 11 can project an image on the projection surface SC. In the description below, an area where a plurality of projection areas PA overlap each other is referred to as "overlap area OL". The description that projection images PI or projection areas PA are adjacent to each other means that the projection images PI or the projection areas PA are adjacent to each other in the first direction D1 or the second direction D2, unless otherwise stated. The projection images PI adjacent to each other in the first direction D1 are referred to as "first projection image" and "second projection image". The projector 11 projecting the first projection image is referred to as "first projector". The projector 11 projecting the second projection image is referred to as "second projector".

In the first embodiment, the projection system 10A also has a control device 12. The control device 12 is connected to the n×m projectors 11 via a communication cable 13 such as a LAN cable. Each projector 11 and the control device 12 may be connected to each other via a wireless LAN instead of the communication cable 13. The user of the projection system 10A can control the projection by each projector 11, via the control device 12.

Figure 2:
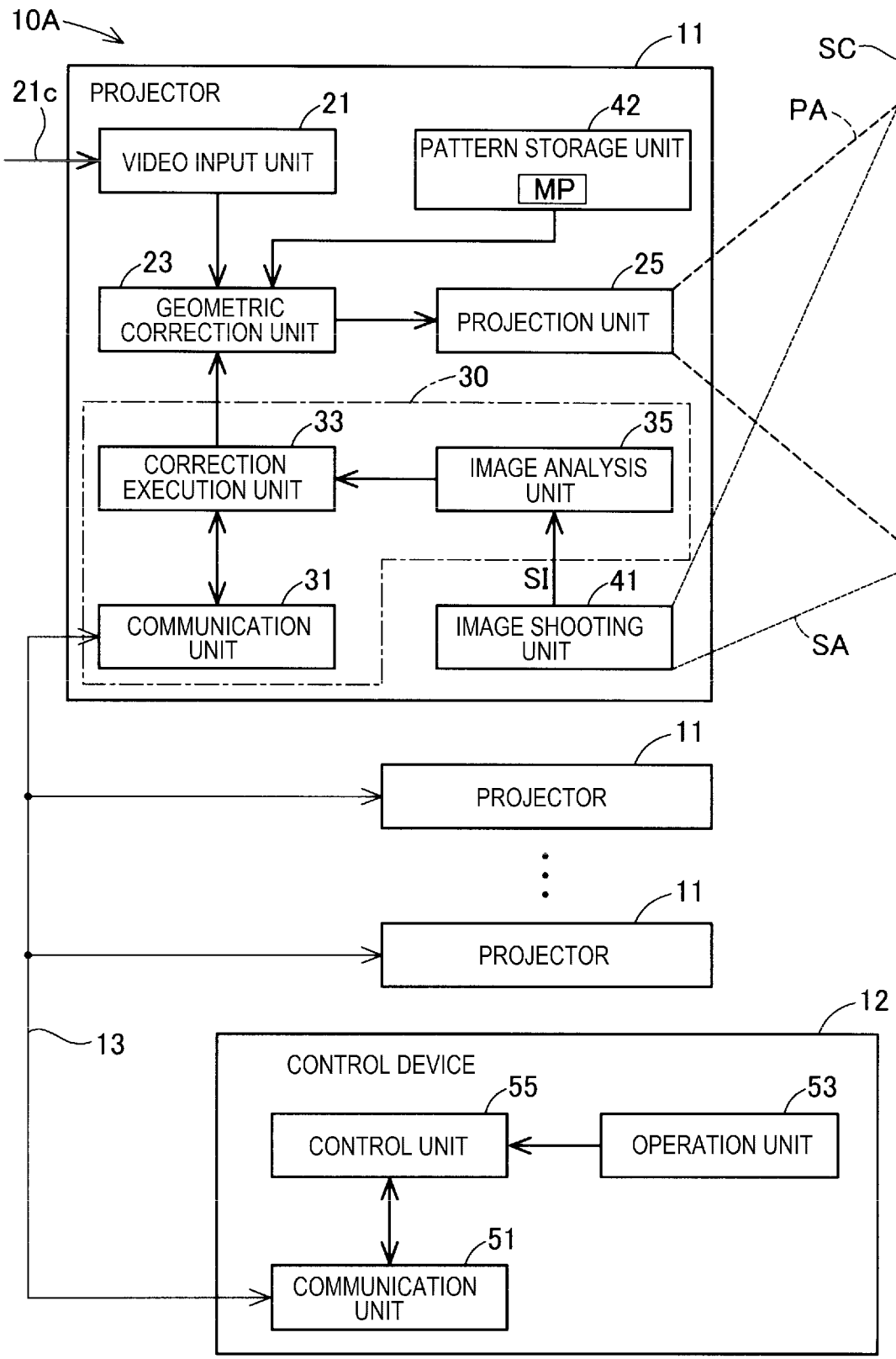
FIG. 2 is a functional block diagram showing the configuration of the projection system.

FIG. 2 is a schematic functional block diagram showing the configuration of the projection system 10A. In the first embodiment, the projectors 11 have the same configuration. As described above, each projector 11 is connected to the control device 12 via the communication cable 13. The projector 11 has a video input unit 21, a geometric correction unit 23, a projection unit 25, a projector control unit 30, an image shooting unit 41, and a pattern storage unit 42.

The video input unit 21 inputs video data representing the projection image PI supplied from an image supply device connected to the projector 11, to the geometric correction unit 23. In FIG. 2, the image supply device is not illustrated. In the first embodiment, the video input unit 21 is made up of an A/D converter. The video input unit 21 converts analog video data inputted via a video cable 21c such as an HDMI cable into digital data and inputs the digital data to the geometric correction unit 23. "HDMI" is a registered trademark.

The geometric correction unit 23 performs geometric correction on video data inputted from outside, with amount of correction inputted by a correction execution unit 33, described later, and outputs the geometrically corrected video data to the projection unit 25. In the geometric correction, the coordinate system of the video data is converted according to the inputted amount of correction. To "convert the coordinate system" means converting the correspondence of the display position of a pixel to the coordinate value of the pixel on the data. The geometric correction is carried out by a known method such as keystone correction. The amount of correction can be interpreted as the amount of change in a parameter included in a function used for such coordinate conversion. In the first embodiment, the geometric correction unit 23 is made up of a video processing circuit.

The geometric correction unit 23 also receives an input of image data representing a measurement pattern MP from the pattern storage unit 42 and inputs the image data as video data of a projection image PI representing the measurement pattern MP to the projection unit 25, as with the video data inputted from the video cable 21c. Thus, the projection unit 25 projects the projection image PI of the measurement pattern MP. The measurement pattern MP will be described later.

The projection unit 25 projects image light representing the projection image PI onto the projection surface SC. The projection unit 25 has an illumination system made up of a light valve and an LED, a liquid crystal panel, and a projection lens. In FIG. 2, the illustration of these components of the projection unit 25 is omitted for the sake of convenience. The projection unit 25 causes the liquid crystal panel to modulate illumination light emitted from the illumination system into image light representing the projection image PI and causes the projection lens to enlarge and project the image light onto the screen SC. The liquid crystal panel modulates the illumination light, based on the video data of the projection image PI inputted from the geometric correction unit 23.

The projector control unit 30 controls operations of the projector 11. The projector control unit 30 is made up of one or a plurality of processors and a main storage device. The projector control unit 30 executes a program or command read onto the main storage device and thus implements various functions. The projector control unit 30 may also be made up of a combination of a plurality of circuits for implementing each function.

The projector control unit 30 implements the functions of a communication unit 31, a correction execution unit 33, and an image analysis unit 35. It can be interpreted that the projector 11 has the communication unit 31, the correction execution unit 33, and the image analysis unit 35, as functional units. The communication unit 31 controls communication with another projector 11 and the control device 12 connected via the communication cable 13.

The correction execution unit 33 controls the geometric correction unit 23 under the control of a control unit 55 of the control device 12. The correction execution unit 33 decides an amount of correction for the geometric correction executed by the geometric correction unit 23 and inputs the amount of correction to the geometric correction unit 23. The correction execution unit 33 executes, via the geometric correction unit 23, processing to cause the projection unit 25 to project a reference image used to decide the amount of correction into the projection area PA. The processing to decide the amount of correction for the geometric correction and the reference image will be described later.

The image analysis unit 35 analyzes a shot image SI inputted from the image shooting unit 41. The image analysis unit 35 performs various kinds of calculation processing to acquire a coordinate system of the projection area PA of the projector 11 on the projection surface SC, using the result of the analysis of the shot image SI showing the projection image PI of the measurement pattern MP. To "acquire a coordinate system" means establishing a correspondence between a coordinate value and a position expressed by the coordinate value. The processing to acquire the coordinate system of the projection area PA using the measurement pattern MP will be described later.

The coordinate system of the projection area PA found by the image analysis unit 35 is used by the correction execution unit 33 when deciding the amount of correction for the geometric correction. The coordinate system of the projection area PA found by the image analysis unit 35 is also transmitted from the correction execution unit 33 to another projector 11 via the communication unit 31 so that another projector 11 can use the coordinate system when deciding the amount of correction for the geometric correction.

The image shooting unit 41 shoots an image of the projection area PA of the projector 11 and generates the shot image SI. The image shooting unit 41 is made up of, for example, a camera using a CCD image sensor, or the like. The image shooting unit 41 is provided at a predetermined position to the projection unit 25, in the projector 11. It is desirable that an image shooting area SA of the image shooting unit 41 includes the entirety of the projection area PA of the projector 11. The shot image SI generated by the image shooting unit 41 is inputted to the image analysis unit 35, as described above.

The pattern storage unit 42 stores image data representing the measurement pattern MP, in a non-volatile manner. The pattern storage unit 42 is made up of, for example, a hard disk, ROM, or another non-volatile semiconductor memory. The measurement pattern MP is inputted to the geometric correction unit 23 under the control of the correction execution unit 33 and projected onto the projection surface SC by the projection unit 25.

The control device 12 has a communication unit 51, an operation unit 53, and a control unit 55. The communication unit 51 controls communication with each projector 11 forming the projection system 10A and connected via the communication cable 13. The operation unit 53 is a device for accepting an operation from the user. The operation unit 53 is made up of, for example, a keyboard, mouse, remote controller or the like. The user can control operations of each projector 11 by operating the operation unit 53.

The control unit 55 is made up of, for example, a computer having one or a plurality of processors and a main storage device. The control unit 55 executes a program or command read onto the main storage device and thus implements various functions. The control unit 55 may also be made up of a combination of a plurality of circuits for implementing each function.

The control unit 55 functions as a superordinate control unit to the projector control unit 30 in each projector 11 and controls the entirety of the projection system 10A. The control unit 55 controls the correction execution unit 33 of each projector 11 and executes composite projection image correction processing to correct a distortion of each projection image PI forming the composite projection image CI.

FIG. 3 is an explanatory view showing a flow of the composite projection image correction processing executed by the control unit 55. The composite projection image correction processing is started when the user gives a command to start execution via the operation unit 53 of the control device 12. The composite projection image correction processing may be executed as initial processing when the projection by the projection system 10A starts.

In step S10, the control unit 55 executes projection area connection processing to connect the projection areas PA of the individual projectors 11. In the projection area connection processing, the positional relation between the individual projection areas PA is found and geometric correction to connect the coordinate systems of the projection areas PA adjacent to each other is executed on the coordinate system of each projection area PA. The projection area connection processing generates a single common coordinate system where the coordinate systems of the individual projection areas PA are connected together, on the projection surface SC.

The execution of the projection area connection processing in step S10 may be omitted if there is a history of the projection area connection processing executed in the past and the individual projection areas PA are already connected together, making a common coordinate system already known. Also, step S10 may be omitted, for example, if each projector 11 is installed at a predetermined position and with a predetermined attitude to the projection surface SC so that a predetermined common coordinate system is constructed on the projection surface SC. The control unit 55 may display a message on the projection surface SC to ask the user whether to execute the projection area connection processing or not.

The projection area connection processing executed in step S10 will now be described with reference to FIG. 4 and FIGS. 5A to 5C. FIG. 4 is an explanatory view showing a flow of the projection area connection processing. In the projection area connection processing in the first embodiment, the projection areas PA that are adjacent to each other are connected together, using the shot image SI obtained by shooting an image of the measurement pattern MP projected by each projector 11, and a single coordinate system common to the individual projection areas PA on the projection surface SC is thus generated.

In step S110, each projector 11 projects the measurement pattern MP in its own projection area PA in an order designated by the control unit 55 and causes its own image shooting unit 41 to shoot an image of the measurement pattern MP projected on the projection surface SC. The shot image SI generated by the image shooting at this time is referred to as "first shot image SIa".

Figure 5A:
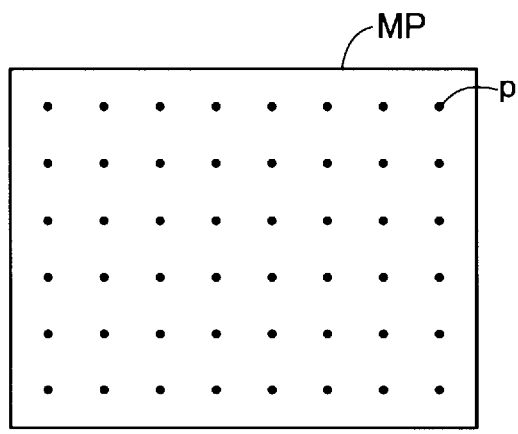
FIG. 5A is a schematic view showing an example of a measurement pattern.
Figure 5B:
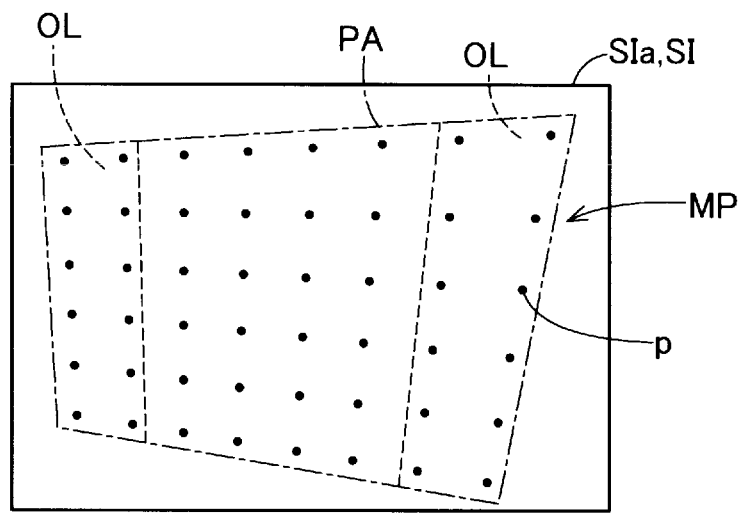
FIG. 5B is a schematic view showing an example of a first shot image.

FIG. 5A is a schematic view showing an example of the measurement pattern MP. In the measurement pattern MP, measuring point p indicating predetermined coordinate positions are dispersed. In the example of FIG. 5A, circular point images showing the measuring points p are arranged with a predetermined spacing from each other in the shape of a lattice. The measurement pattern MP is formed in such a way that such measuring points p are also projected in the overlap area OL in the projection area PA. FIG. 5B is a schematic view showing an example of the first shot image SIa. The first shot image SIa in FIG. 5B is the shot image SI shot by the projector 11 projecting the measurement pattern MP in FIG. 5A, via its own image shooting unit 41. The first shot image SIa shows the state where the measuring points p are arranged over the entirety of the projection area PA.

Figure 5C:
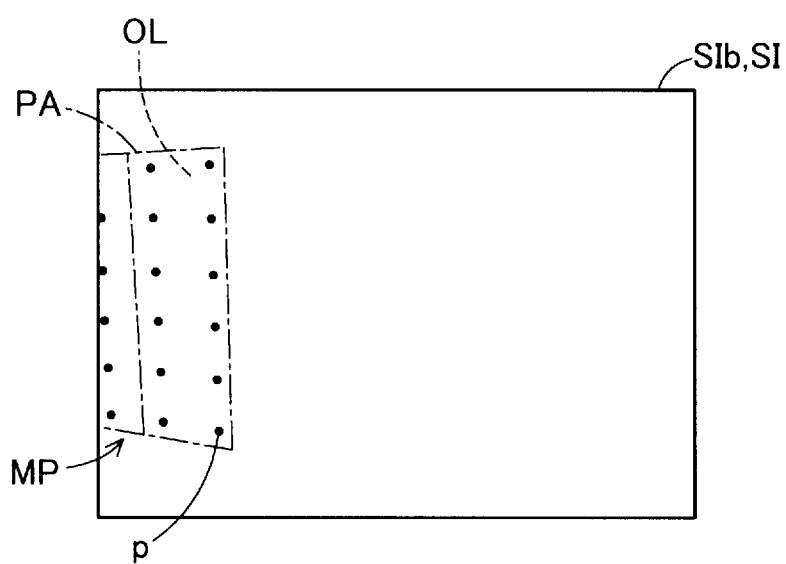
FIG. 5C is a schematic view showing an example of a second shot image.

In step S110, each projector 11 also causes its own image shooting unit 41 to shoot an image of its own projection area PA when the measurement pattern MP is projected in the projection area PA adjacent to its own projection area PA. The shot image SI generated by the image shooting at this time is referred to as "second shot image SIb". FIG. 5C is a schematic view showing an example of the second shot image SIb. The second shot image SIb shows the measuring points p displayed in the overlap area OL, of the measurement pattern MP projected in the adjacent projection area PA. The second shot image SIb in FIG. 5C is the shot image SI shot by the projector 11 shooting the first shot image SIa in FIG. 5B, via its own image shooting unit 41, when the projector 11 itself does not project the measurement pattern MP but the projector 11 to the left projects the measurement pattern MP.

In step S110, it is desirable that the control unit 55 sets an order in which each projector 11 projects the measurement pattern MP, in such a way that the measurement pattern MP is not simultaneously projected in the projection areas PA adjacent to each other. In step S110, the control unit 55 may perform control so as to project the measurement pattern MP simultaneously in two or more projection areas PA spaced apart from each other in the first direction D1 or the second direction D2 and situated at positions that are not adjacent to each other. Thus, the processing time of step S110 can be reduced.

In step S120, the image analysis unit 35 of each projector 11 analyzes the first shot image SIa and extracts the position of each measuring point p shown in the first shot image SIa. The image analysis unit 35 then acquires the current coordinate system of the projection area PA, based on the extracted coordinates on the image data of each measuring point p, and calculates the coordinates of each measuring point p on the coordinate system of the projection area PA, that is, the coordinates representing the display position of the measuring point p on the projection surface SC. The correction execution unit 33 of each projector 11 transmits the result of the calculation to the control unit 55.

In step S130, the image analysis unit 35 of each projector 11 analyzes the second shot image SIb and extracts the position of each measuring point p in the overlap area OL shown in the second shot image SIb. The correction execution unit 33 of each projector 11 transmits the result of the extraction to the control unit 55.

In step S140, the control unit 55 establishes a correspondence between the coordinates of the measuring point p on the coordinate system of each projection area PA obtained from the first shot image SIa and the information of the position of the measuring point p shown in the overlap area OL obtained from the second shot image SIb. The control unit thus specifies the positional relation between the projection areas PA adjacent to each other. The control unit 55 transmits information representing the positional relation between the projection areas PA adjacent to each other, to the corresponding projector 11. The "information representing the positional relation between the projection areas PA adjacent to each other" is information representing the relative positional relation between the display positions of pixels within the overlap area OL of the projection areas PA adjacent to each other. In this way, in steps S110 to S140, the positional relation between the projection areas PA of the n×m projectors 11 is found, using the measuring point p in the overlap area OL shown in the shot image SI shot by the image shooting unit 41 of each of the n×m projectors 11, as an indicator.

In step S150, the correction execution unit 33 of each projector 11 decides an amount of correction for geometric correction to convert the coordinate system of each projection area PA, based on the information representing the positional relation between the projection areas PA adjacent to each other transmitted from the control unit 55. The correction execution unit 33 calculates the amount of correction for the geometric correction in such a way that the display position of the pixel in the projection area PA coincides with the display position of the pixel in the adjacent projection area PA in the overlap area OL. The correction execution unit 33 inputs the calculated amount of correction to the geometric correction unit 23. Thus, the coordinate systems of the projection areas PA adjacent to each other are connected together. The control unit 55 acquires a single common coordinate system where the coordinate systems of the individual projection areas PA are connected together, on the projection surface SC.

Figure 6:
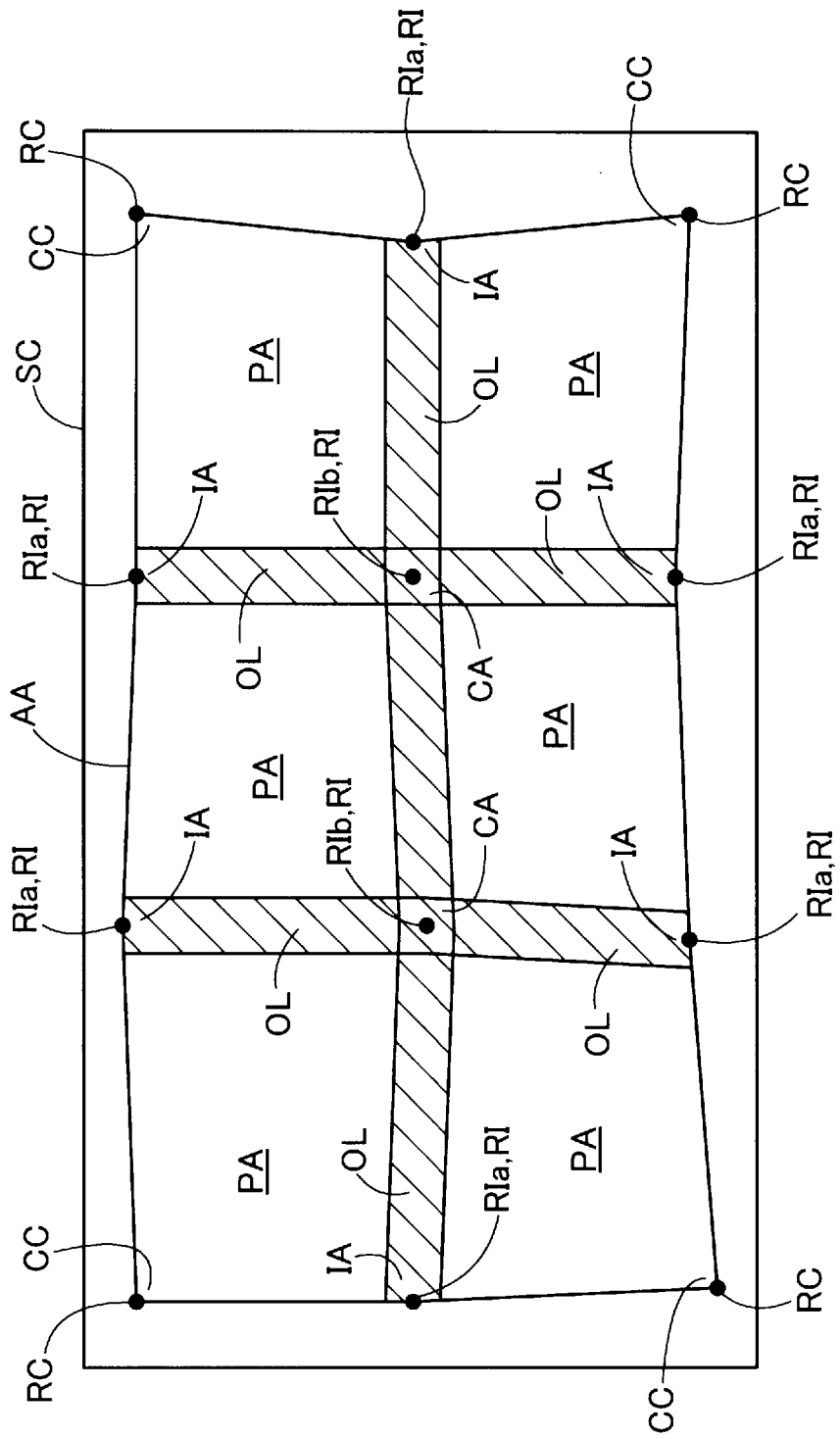
FIG. 6 is a schematic view showing an example of the state of projection areas after connection.

FIG. 6 schematically shows an example of the projection areas PA connected together by the projection area connection processing. In FIG. 6, the overlap area OL between the individual projection areas PA is hatched for the sake of convenience. In the state where the coordinate systems of the projection areas PA adjacent to each other are simply connected together, as illustrated in FIG. 6, each projection area PA may be distorted. Such a distortion may occur because the position of arrangement and attitude of arrangement at the time of projection vary from one projector 11 to another. Such a distortion may also occur because the magnitude of the distortion of the projection lens varies from one projector 11 to another.

The processing of step S20 onward in FIG. 3 is processing to adjust such a distortion of each projection area PA in the composite projection image CI in response to an operation by the user.

Step S20 is a process in which the control unit 55 causes the correction execution unit 33 of each projector 11 to start displaying a reference image RI onto the projection surface SC. The reference image RI shows the position of a reference point common to a plurality of projection areas PA adjacent to each other. The reference image RI shows a position of predetermined coordinates common to a plurality of projection areas PA adjacent to each other. In the example of FIG. 6, the reference image RI is displayed as a circular dot. However, the shape of the reference image RI is not particularly limited.

The reference image RI may be displayed, for example, at a center position in the direction in which two adjacent projection areas PA are arranged, in the overlap area OL between the two adjacent projection areas PA. That is, if the overlap area OL extends from one side of the projection area PA to a position of 20% of the length of a side intersecting the one side, the reference image RI may be displayed at a position of 10% of the length of the side intersecting the one side from the one side of the projection area PA.

The reference image RI displayed in an intersection area IA, which is an area where an inner peripheral edge part of a whole projection area AA as an overall projection area where the composite projection image CI formed by all the projection areas PA is projected and an end part of the overlap area OL intersect each other, is also referred to as "outer peripheral reference image RIa". That is, the outer peripheral reference image RIa means a part of the reference image RI that is displayed at the end part of the overlap area OL. It is desirable that at least one outer peripheral reference image RIa each is displayed in each intersection area IA. In the first embodiment, one outer peripheral reference image RIa each is displayed in each intersection area IA.

In the first embodiment, the outer peripheral reference image RIa is projected by both of two projectors 11 whose projection area PA includes the overlap area OL where the outer peripheral reference image RIa is displayed. However, the outer peripheral reference image RIa may simply be displayed by at least one of the two projectors 11.

The reference image RI displayed in a center area CA where four projection areas PA including two projection areas PA adjacent to each other in the first direction D1 and two projection areas PA adjacent to each other in the second direction overlap each other is also referred to as "center reference image RIb". It is desirable that at least one center reference image RIb is displayed in each center area CA. In the first embodiment, one center reference image RIb each is displayed in each center area CA.

In the first embodiment, one center reference image RIb is projected by four projectors 11 whose projection area PA includes the overlap area OL where the center reference image RIb is displayed. The center reference image RIb may simply be displayed by at least one of the four projectors 11. In the example of FIG. 6, where n=3 and m=2 hold, the center reference image RIb on the left in the illustration is projected by the four projectors 11 to the two projection areas PA in the left line in the illustration and the two projection areas PA in the center line. Meanwhile, the center reference image RIb on the right in the illustration is projected by the four projectors 11 to the two projection areas PA in the right line in the illustration and the two projection areas PA in the center line.

Figure 7:
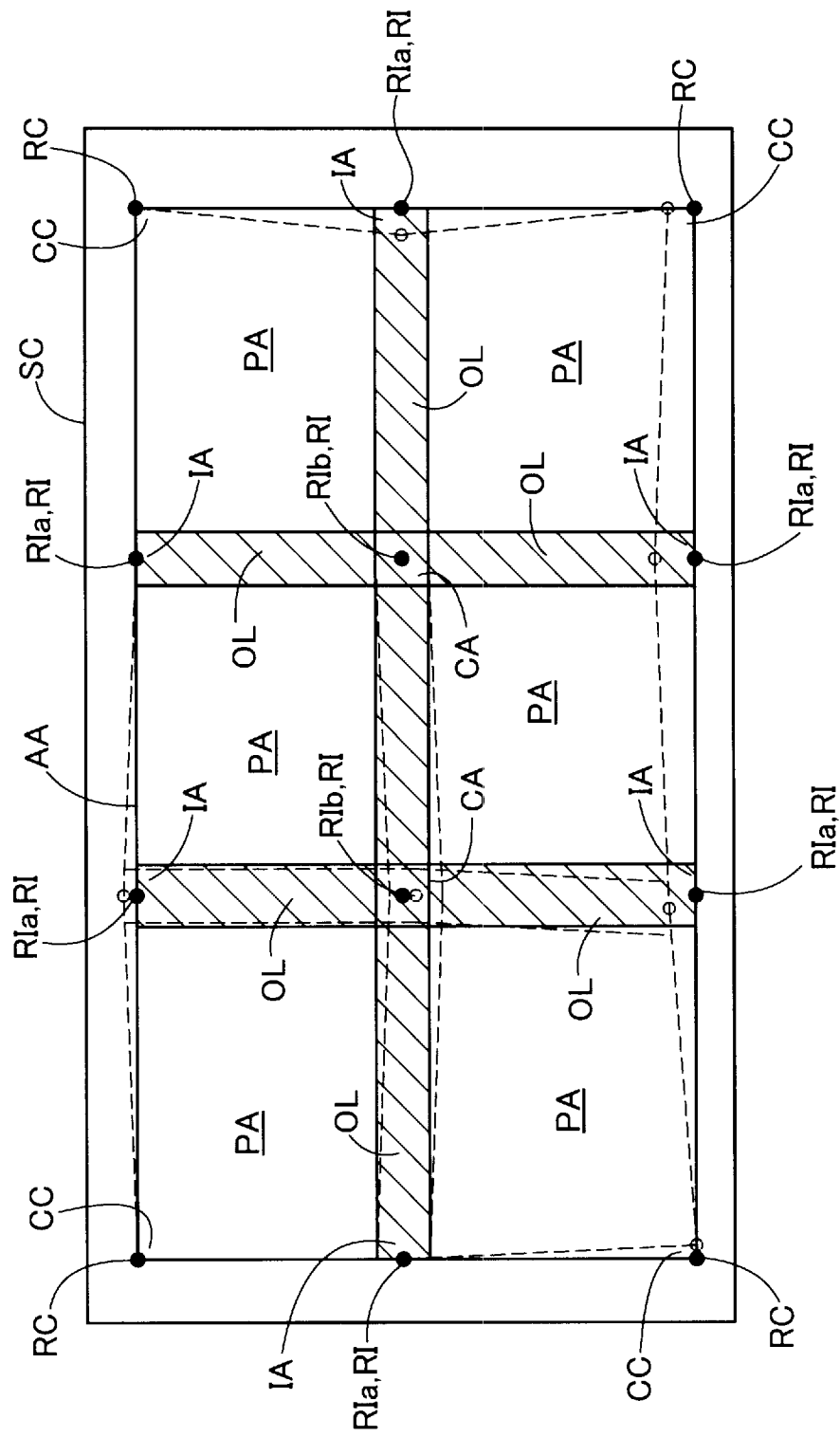
FIG. 7 is a schematic view showing an example of the state of arrangement of projection areas after geometric correction is executed.

In the first embodiment, in step S20, the control unit 55 causes corner reference images RC to be displayed on the projection surface SC, in addition to the reference images RI. The corner reference images RC indicate the four corner parts CC in the four corners of the whole projection area AA, where the composite projection image CI is projected. The corner reference images RC are displayed by the four projectors 11 having the projection area PA in the four corners. In the first embodiment, the total number of the reference images RI including the outer peripheral reference images RIa and the center reference image RIb, and the corner reference images RC, is (n+1)×(m+1). In the example of FIGS. 6 and 7, where n=3 and m=2 hold, the total number of the reference images RI including the outer peripheral reference images RIa and the center reference image RIb, and the corner reference images RC, is 12.

In step S30, the control unit 55 accepts an operation to move the individual reference images RIa, RIb and the corner reference images RC, from the user via the operation unit 53. The user selects a reference image RIa, RIb, RC to be a target of the moving operation, via the operation unit 53. The user then designates a direction of movement and a moving distance for the selected reference image RIa, RIb, RC. Alternatively, the user may directly designate, by a pointer, a position on the projection surface SC to which the user intends to move the selected reference image RIa, RIb, RC. The control unit 55 may cause the correction execution unit 33 to display a range where each reference image RIa, RIb, RC can be moved, for the sake of convenience for the user.

In step S40, the control unit 55 causes the corresponding projector 11 to execute the geometric correction in such a way that each reference image RIa, RIb, RC moves to the position on the projection surface SC designated by the user's operation. If the user carries out an operation to move one of the reference images RI in one of the overlap areas OL, the control unit 55 causes each of the plurality of projectors 11 projecting the projection image PI in the overlap area OL where this reference image RI is displayed, to execute the geometric correction of the projection image PI. If the user carries out an operation to move one of the corner reference images RC, the control unit 55 causes the projector 11 projecting this corner reference image RC to execute the geometric correction of the projection image PI.

In the geometric correction in step S40, the coordinate system in the projection area PA where the reference image RI as a moving target is displayed is converted in such a way that the display position of each reference image RI moves to the position on the projection surface SC designated by the user. In the projector 11 which is to execute the geometric correction, the correction execution unit 33 calculates an amount of correction for carrying out such coordinate conversion, and inputs the amount of correction to the geometric correction unit 23.

In the process of step S50, the projector 11 which has executed the geometric correction starts projecting the geometrically corrected projection image PI. When the user determines that the distortion in each projection area PA of the composite projection image CI has been resolved by the user's own operation, the user can give an instruction to complete the composite projection image correction processing to the control unit 55 of the control device 12 via the operation unit 53. In step S60, the control unit 55 completes the composite projection image correction processing in response to the instruction from the user and causes each projector 11 to end the display of each reference image RIa, RIb, RC.

FIG. 7 is a schematic view showing an example of the state of arrangement of the projection areas PA after the geometric correction is executed in each projection area PA. In FIG. 7, an example of the positions of the projection areas PA and the reference images RIa, RIb, RC before the geometric correction is executed in each projection area PA is shown by dashed lines.

In the composite projection image correction processing, the user carries out an operation to move the reference images RIa, RIb, RC in such away that the distortion in each projection area PA decreases, and in response to the operation, the geometric correction is executed into a direction that reduces the distortion in each projection area PA on the projection surface SC. Therefore, a local distortion as generated in each projection image PI forming the composite projection image CI due to the difference in the position of arrangement and the attitude of arrangement between the individual projectors 11 or due to the difference in the distortion between the projection lenses can be partly corrected according to need by the user's intuitive operation. Thus, deterioration in the image quality due to the distortion of each projection image PI forming the composite projection image CI can be restrained easily.

Particularly, in the projection system 10A, if the user operates the reference images RIa, RIb displayed in the overlap area OL between the projection areas PA adjacent to each other, the distortion of the projection areas PA adjacent to each other is corrected at a time while the connection between the projection areas PA adjacent to each other is maintained. Therefore, unlike a configuration to perform distortion correction on the entirety of a single image formed by a combination of a plurality of projection images, an inconvenience such as increase in shift or distortion at the joints between the individual projection images due to distortion correction is restrained.

In the projection system 10A according to the first embodiment, in step S10 of the composite projection image correction processing, the positional relation between the individual projection areas PA is found, using the measuring point p in the overlap area OL shown in the shot image SI shot by the image shooting unit 41 of each projector 11, as an indicator. Using the positional relation, the reference image RI is displayed at a position in the overlap area OL that is common to a plurality of projection areas PA. In this way, in the projection system 10A, the display position of the reference image RI is specified after the positional relation between the individual projection areas PA is established based on the indicator in the overlap area OL, and the distortion of each projection area PA is adjusted, based on the display position of the reference image RI. Therefore, the occurrence of a distortion or shift at the joints between the individual projection images PI is restrained with high accuracy, and the image quality of the composite projection image CI is improved further.

Particularly, in the first embodiment, the measuring point p in the measurement pattern MP projected in the overlap area OL by each projector 11 is used as an indicator to specify the positional relation between the individual projection areas PA. This configuration does not need a mark on the projection surface SC that serves as an indicator to find the positional relation between the individual projection areas PA. Thus, the positional relation between the individual projection areas PA can be easily found.

In the projection system 10A according to the first embodiment, at least one outer peripheral reference image RIa each is displayed in the area where the inner peripheral edge part of the whole projection area AA and the end part of the overlap area OL intersect each other. Thus, the user can easily adjust the distortion of the outer peripheral shape of the whole projection area AA by an operation to move the outer peripheral reference image RIa.

In the projection system 10A according to the first embodiment, one corner reference image RC each is also displayed in each of the four corners of the composite projection image CI. Thus, the user can easily adjust the distortion in the four corner parts CC of the whole projection area AA by an operation to move the corner reference image RC, and can further reduce the distortion of the outer peripheral shape of the composite projection image CI.

In the projection system 10A according to the first embodiment, one center reference image RIb each is displayed in the center area CA, where four projection areas PA overlap each other. In response to an operation by the user to move the display position of the center reference image RIb, each of the four projectors 11 whose projection area PA includes the center area CA where the center reference image RIb is displayed executes the geometric correction of the projection image PI. Thus, the operation to move one center reference image RIb can easily adjust the distortion at the joints between the four projection areas PA within the composite projection image CI at a time while maintaining the connection of the four projection images PI.

In the projection system 10A according to the first embodiment, in the composite projection image correction processing, the total number of the outer peripheral reference images RIa, the center reference image RIb, and the corner reference images RC displayed in the projection surface SC, is (n+1)×(m+1). In the projection system 10A according to the first embodiment, one of the reference images RIa, RIb, RC that can be moved by the moving operation by the user is displayed in each of the four corners of each projection area PA. Thus, the user can visually recognize the distortion of each projection area PA, based on the arrangement of the reference images RIa, RIb, RC. Also, the distortion of each projection area PA can be adjusted easily and accurately while the connection with the adjacent projection area PA is maintained.

As described above, the projection system 10A according to the first embodiment and the control method implemented by the control unit 55 of the projection system 10A can easily correct the distortion generated in each of the projection areas PA while maintaining the connection between the individual projection areas PA. Moreover, the projection system 10A according to the first embodiment and the control method for the projection system 10A can achieve various advantageous effects described in the first embodiment.

2. Second Embodiment

Figure 8:
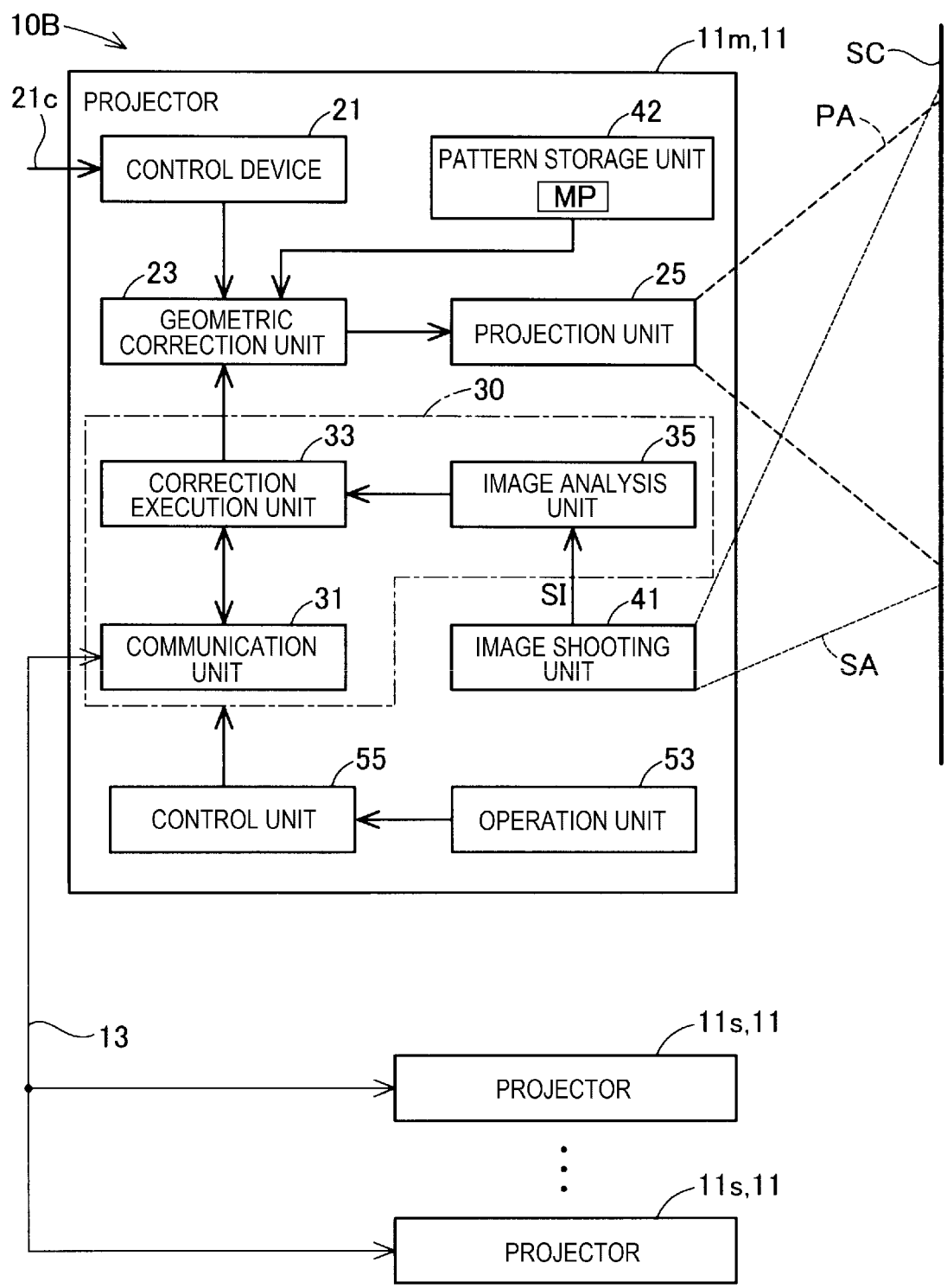
FIG. 8 is a schematic view schematically showing the configuration of a projection system according to a second embodiment.

FIG. 8 is a schematic view schematically showing the configuration of a projection system 10B according to a second embodiment. The projection system 10B according to the second embodiment has substantially the same configuration as the projection system. 10A according to the first embodiment except that one of the n×m projectors 11 is a master projector 11m functioning in place of the control device 12. The master projector 11m has substantially the same configuration as the projector 11 described in the first embodiment except that the master projector 11m has a control unit 55 and an operation unit 53 having functions equivalent to those of the control device 12 in the first embodiment. The configuration of the n×m−1 projectors 11 apart from the master projector 11m is substantially the same as the configuration of the projector 11 described in the first embodiment.

The master projector 11m, in collaboration with salves projectors 11s, which are the other n×m−1 projectors 11, forms one composite projection image CI made up of n×m projection images PI arranged together, on the projection surface SC. The projector control unit 30 of the master projector 11m operates under the control of the control unit 55. In the master projector 11m, the projector control unit 30 and the control unit 55 may be formed as a single control unit implemented by one or a plurality of processors.

The projection unit 25 of the master projector 11m projects one of the n×m projection images PI. The communication unit 31 of the master projector 11m controls communication with the n×m−1 slave projectors 11s via the communication cable 13. The communication unit 31 may communicate with the slave projectors 11s via a wireless LAN instead of the communication cable 13. The master projector 11m accepts an operation by the user via the operation unit 53.

The control unit 55 of the master projector 11m executes composite projection image correction processing similar to the processing described in the first embodiment. In the composite projection image correction processing, the n×m projectors 11 including the master projector 11m and the n×m−1 slave projectors 11s project reference images RIa, RIb, RC onto the projection surfaces SC. Then, the geometric correction corresponding to an operation by the user to move the display positions of the reference images RIa, RIb, RC is executed.

As described above, the master projector 11m of the projection system 10B according to the second embodiment and the control method implemented by the control unit 55 of the master projector 11m can easily correct the distortion of each projection area PA, as in the first embodiment. Also, the master projector 11m in the second embodiment and the control method for the master projector 11m can achieve various advantageous effects described in the first embodiment in additional to various advantageous effects described in the second embodiment.

3. Other Embodiments

The various configurations described in the above embodiments can also be implemented, for example, in the forms described below. Each of the configurations of the other embodiments described below is defined as an example of an embodiment to carry out the technique in this disclosure, similarly to the above embodiments.

3-1. Other Embodiment 1

The position where the reference image RI is displayed is not limited to the positions described in the above embodiments. For example, the reference images RI may include a reference image displayed at a center position in the first direction D1 or the second direction D2 of each projection area PA, in the overlap area OL. A configuration in which only the outer peripheral reference images RIa may be displayed as the reference images RI, without displaying the center reference images RIb, may be employed. Meanwhile, a configuration in which only the center reference images RIb are displayed may be employed. In each of the above embodiments, a configuration in which only the reference images RI in the overlap area OL are displayed, without displaying the corner reference images RC, may be employed. Also, for example, a configuration in which the reference images RI, RC are displayed only for apart of projection areas PA of the projection areas PA forming the composite projection image CI may be employed. The reference images RI, RC are not limited to circular point images. The reference images RI, RC may be any images that can show a reference coordinate position for geometric correction, as a reference point.

3-2. Other Embodiment 2

In the projection area connection processing executed in step S10 of the composite projection image correction processing, each projector 11 may detect a graphic pattern or a feature point provided in advance on the projection surface SC shown in the shot image SI, as a measuring point, instead of projecting the measurement pattern MP, to find the positional relation between the projection areas PA. Also, only one or some of the projectors 11 in the projection systems 10A, 10B may have the image shooting unit 41. For example, of two projectors 11 having projection areas PA adjacent to each other, one projector 11 may have the image shooting unit 41 and detect the position of the one projector's own projection area PA in relation to the projection area PA of the other projector 11. Also, the control device 12 or the master projector 11m may have an image shooting unit that can shoot an image of the entirety of the projection area of the composite projection image CI.

3-3. Other Embodiment 3

In the above embodiments, a part or all of the functions and processing implemented by software may be implemented by hardware. Also, a part or all of the functions and processing implemented by hardware may be implemented by software. For example, as the hardware, various circuits can be used such as an integrated circuit, a discrete circuit, or a circuit module made up of a combination of these circuits. In each of the above embodiments, the control unit 55 may be formed by such a circuit.

The invention is not limited to the above embodiments, examples, and modifications and can be implemented with various configurations without departing from the spirit of the invention. For example, technique features in embodiments, examples, and modifications corresponding to technique features of each configuration described in the summary of the invention can be replaced or combined according to need, in order to solve a part or all of the foregoing problems or in order to achieve apart or all of the foregoing effects. Also, not only technical features that are described as inessential in this specification, but also technique features that are not described as essential in this specification can be deleted according to need.

The entire disclosures of Japanese patent application no. JP 2018-015064 filed on Jan. 31, 2018 is expressly incorporated by reference herein.

What is claimed is:

1. A projection system which arranges n×m projection images in such a way that n projection images are arranged in a first direction and that m projection images are arranged in a second direction intersecting the first direction, n being an arbitrary natural number equal to or greater than 2, m being an arbitrary natural number equal to or greater than 1, and in a state where projection areas of the projection images partly overlap each other in the first direction or the second direction, thus forming one composite projection image on a projection surface, the projection system comprising:
n×m projectors, each projecting the projection image on the projection surface;
an operation device which accepts an operation by a user; and
a processor which controls the projection by each of the n×m projectors,
wherein the processor
(i) causes at least one projector projecting the projection image to project a reference image showing a position of a reference point common to each of the projection areas, in an overlap area where the projection areas overlap each other,
(ii) accepts an operation to move the reference image by the user via the operation device, and
(iii) causes each projector projecting the projection image in the overlap area where the reference image is displayed, of the n×m projectors, to execute geometric correction to convert a coordinate system of the projection area in such a way that the position of the reference point moves to a position on the projection surface designated by the user via the operation, and to project the projection image.

2. The projection system according to claim 1, wherein each of the n×m projectors has a camera which shoots an image of the projection area of the corresponding projector, and
the processor finds a positional relation between the respective projection areas of the n×m projectors, using a measuring point in the overlap area shown in a shot image shot by the camera of each of the n×m projectors, as an indicator, and causes the reference image to be projected at a position common to a plurality of the projection images overlapping each other in the overlap area, using the positional relation.

3. The projection system according to claim 1, wherein the processor causes the reference image to be projected, at least one each in an area where an inner peripheral edge part of an area where the composite projection image is formed and an end part of the overlap area intersect each other.

4. The projection system according to claim 3, wherein when m is a natural number equal to or greater than 2, the processor
(i) causes at least one of four projectors whose projection area includes a center area where four of the projection areas including two of the projection areas adjacent to each other in the first direction and two of the projection areas adjacent to each other in the second direction overlap each other, of the n×m projectors, to project a center reference image which is the reference image in the center area, and
(ii) causes a corner reference image showing positions of four corners of an area where the composite projection image is projected, to be displayed and projected, and
a total number of the reference images including the center reference image and the corner reference images is (n+1)×(m+1).

5. The projection system according to claim 1, wherein the processor
(i) causes a corner reference image to be projected, the corner reference image showing positions of four corners of an area where the composite projection image is projected,
(ii) Accepts an operation to move the corner reference image by the user via the operation device, and
(iii) causes a projector projecting the corner reference image for which the operation to move is carried out by the user, of the n×m projectors, to execute geometric correction to convert a coordinate of the projection area in such a way that the positions of the corners shown by the corner reference image move to positions on the projection surface designated by the user via the operation device, and to project the projection image.

6. The projection system according to claim 1, wherein when m is a natural number equal to or greater than 2, the processor
(i) causes at least one of four projectors whose projection area includes a center area where four of the projection areas including two of the projection areas adjacent to each other in the first direction and two of the projection areas adjacent to each other in the second direction overlap each other, of the n×m projectors, to project a center reference image which is the reference image in the center area, and
(ii) causes each of the four projectors to execute geometric correction to perform coordinate conversion in such a way that the position of the reference point shown by the center reference image moves to a position on the projection surface designated by the user via the operation device, and to project the projection image.

7. The projection system according to claim 1, wherein each of the n×m projectors includes a first projector which projects a first projection image on the projection surface and a second projector which projects a second projection image on the projection surface, arranging the second projection image in a state where a first projection area of the first projection image and a second projection area of the second projection image partly overlap each other in the first direction, the processor controls the projection by each of the first projector and the second projector, and
   (i) causes the first projector to project a reference image showing a position of a reference point common to the first projection area and the second projection area, in an overlap area where the first projection area and the second projection area overlap each other,
   (ii) accepts an operation to move the reference image by the user via the operation device, and
   (iii) causes the first projector and the second projector respectively projecting the first projection image and the second projection image in the overlap area where the reference image is displayed, to execute geometric correction to convert a coordinate system of the first projection area and the second projection area in such a way that the position of the reference point moves to a position on the projection surface designated by the user via the operation, and to project the first projection image and the second projection image.

8. A method for controlling a projection system in which n×m projectors arrange n×m projection images on a projection surface in such a way that n projection images are arranged in a first direction and that m projection images are arranged in a second direction intersecting the first direction, n being an arbitrary natural number equal to or greater than 2, m being an arbitrary natural number equal to or greater than 1, and in a state where projection areas of the projection images partly overlap each other in the first direction or the second direction, thus forming one composite projection image,
   the method comprising:
   causing at least one projector projecting the projection image to project a reference image showing a position of a reference point common to each of the projection areas, in an overlap area where the projection areas overlap each other;
   accepting an operation to move the reference image from the user; and
   causing each projector projecting the projection image in the overlap area where the reference image is displayed, of the n×m projectors, to execute geometric correction to convert a coordinate system of the projection area in such a way that the position of the reference point moves to a position on the projection surface designated by the operation by the user, and to project the projection image.

9. The method for controlling a projection system according to claim 8, further comprising:
   causing each of the n×m projectors to shoot an image of the projection area of the corresponding projector, and finding a positional relation between the respective projection areas of the n×m projectors, using a measuring point in the overlap area shown in a shot image shot by each of the n×m projectors, as an indicator,
causing each of the n×m projectors to project the reference image at a position common to a plurality of the projection images overlapping each other in the overlap area, using the positional relation.

10. The method for controlling a projection system according to claim 8, further comprising:
   causing each of the n×m projectors to project the reference image, at least one each in an area where an inner peripheral edge part of an area where the composite projection image is formed and an end part of the overlap area intersect each other.

11. The method for controlling a projection system according to claim 10, further comprising:

when m is a natural number equal to or greater than 2,
   (i) causing at least one of four projectors whose projection area includes a center area where four of the projection areas including two of the projection areas adjacent to each other in the first direction and two of the projection areas adjacent to each other in the second direction overlap each other, of the n×m projectors, to project a center reference image which is the reference image in the center area, and
   (ii) causing a corner reference image showing positions of four corners of an area where the composite projection image is projected, to display and project, and a total number of the reference images including the center reference image and the corner reference images is (n+1)×(m+1).

12. The method for controlling a projection system according to claim 8, further comprising:
   (i) causing a corner reference image to project, the corner reference image showing positions of four corners of an area where the composite projection image is projected,
   (ii) accepting an operation to move the corner reference image by the user, and
   (iii) causing a projector projecting the corner reference image for which the operation to move is carried out by the user, of the n×m projectors, to executing geometric correction to convert a coordinate of the projection area in such a way that the positions of the corners shown by the corner reference image move to positions on the projection surface designated by the user, and projecting the projection image.

13. The method for controlling a projection system according to claim 8, further comprising:
   when m is a natural number equal to or greater than 2,
   (i) causing at least one of four projectors whose projection area includes a center area where four of the projection areas including two of the projection areas adjacent to each other in the first direction and two of the projection areas adjacent to each other in the second direction overlap each other, of the n×m projectors, projecting a center reference image which is the reference image in the center area, and
   (ii) causing each of the four projectors to execute geometric correction to perform coordinate conversion in such a way that the position of the reference point shown by the center reference image moves to a position on the projection surface designated by the user, and to project the projection image.

14. The method for controlling a projection system according to claim 8,
   wherein each of the n×m projectors includes a first projector which projects a first projection image on the projection surface and a second projector which projects a second projection image on the projection surface, arranging the second projection image in a state where a first projection area of the first projection image and a second projection area of the second projection image partly overlap each other in the first direction,
   the method further comprising:
   (i) causing the first projector to project a reference image showing a position of a reference point common to the first projection area and the second projection area, in an overlap area where the first projection area and the second projection area overlap each other,
   (ii) accepting an operation to move the reference image by the user, and (iii) causing the first projector and the second projector respectively projecting the first projection image and the second projection image in the overlap area where the reference image is displayed, to execute geometric correction to convert a coordinate system of the first projection area and the second projection area in such a way that the position of the reference point moves to a position on the projection surface designated by the user, and projecting the first projection image and the second projection image.

15. A projector which, in collaboration with n×m−1 slave projectors, arranges n×m projection images on a projection surface in such a way that n projection images are arranged in a first direction and that m projection images are arranged in a second direction intersecting the first direction, n being an arbitrary natural number equal to or greater than 2, m being an arbitrary natural number equal to or greater than 1, and in a state where projection areas of the projection images partly overlap each other in the first direction or the second direction, thus forming one composite projection image, the projector comprising:

- a projection lens which projects one of the n×m projection images;
- an operation device which accepts an operation by a user; and
- a processor which communicates with the n×m−1 slave projectors and accepts the operation by the user via the operation device and controls the projection by the n×m−1 slave projectors and the projection lens, wherein the processor (i) causes at least one projector projecting the projection image in an overlap area where a plurality of the projection areas overlap each other, of the n×m projectors including the projector and the n×m−1 slave projectors, to project a reference image showing a position of a reference point common to each of the projection areas, in the overlap area, (ii) accepts an operation to move the reference image by the user via the operation device, and (iii) causes each projector projecting the projection image in the overlap area where the reference image to be moved is displayed, of the n×m projectors, to execute geometric correction to convert a coordinate system of the projection area in such a way that the position of the reference point moves to a position on the projection surface designated by the user via the operation, and to project the projection image.

* * * * *